United States Patent
Nugraha et al.

(10) Patent No.: US 10,852,409 B2
(45) Date of Patent: Dec. 1, 2020

(54) METHOD AND DEVICE FOR PROCESSING RADAR SIGNALS

(71) Applicant: Infineon Technologies AG, Neubiberg (DE)

(72) Inventors: Dian Tresna Nugraha, Munich (DE); Andre Roger, Munich (DE); Romain Ygnace, Brunnthal (DE)

(73) Assignee: Infineon Technologies AG, Neubiberg (DE)

( * ) Notice: Subject to any disclaimer, the term of this patent is extended or adjusted under 35 U.S.C. 154(b) by 1022 days.

(21) Appl. No.: 15/081,404

(22) Filed: Mar. 25, 2016

(65) Prior Publication Data

US 2016/0282458 A1   Sep. 29, 2016

(30) Foreign Application Priority Data

Mar. 27, 2015   (DE) .......................... 10 2015 104776

(51) Int. Cl.
  *G01S 13/34*  (2006.01)
  *G06F 13/28*  (2006.01)
  *G01S 13/931* (2020.01)
  *G01S 7/35*   (2006.01)

(52) U.S. Cl.
  CPC ............ *G01S 13/343* (2013.01); *G06F 13/28* (2013.01); *G01S 13/931* (2013.01); *G01S 2007/356* (2013.01)

(58) Field of Classification Search
  CPC ............... G01S 13/931; G01S 13/343; G01S 2007/356; G01S 13/006; G06F 12/1081; G06F 13/28

USPC ......................................................... 342/190
See application file for complete search history.

(56) References Cited

U.S. PATENT DOCUMENTS

| | | | | |
|---|---|---|---|---|
| 4,077,038 A * | 2/1978 | Heller | ................... | G01S 7/2922 342/92 |
| 5,416,854 A * | 5/1995 | Fukuda | ................. | G06F 17/147 382/232 |
| 8,539,120 B1 * | 9/2013 | Sha | ........................ | H04N 19/44 382/232 |
| 9,092,362 B1 * | 7/2015 | Alcantara | ........... | G06F 12/0246 |
| 2001/0037434 A1 * | 11/2001 | Hughes | ................. | G06F 9/3834 711/146 |

(Continued)

FOREIGN PATENT DOCUMENTS

| | | |
|---|---|---|
| EP | 2724498 A1 | 4/2014 |
| EP | 2725498 A2 | 4/2014 |

(Continued)

OTHER PUBLICATIONS

Office Action dated Oct. 2, 2017 for Japanese Patent Application No. 2016-062424 (with English translation).

(Continued)

*Primary Examiner* — Timothy X Pham
(74) *Attorney, Agent, or Firm* — Schiff Hardin LLP

(57) ABSTRACT

A device for processing radar signals is suggested, said device comprising a DMA engine, a buffer and a processing stage, wherein the DMA engine is arranged for conducting a read access to a memory, wherein such read access comprises at least two data entries, and for filling the buffer by resorting the at least two data entries, wherein the processing stage is arranged for processing the data stored in the buffer.

9 Claims, 5 Drawing Sheets

(56) References Cited

U.S. PATENT DOCUMENTS

| | | | | |
|---|---|---|---|---|
| 2002/0038393 | A1* | 3/2002 | Ganapathy | G06F 13/28 710/22 |
| 2006/0206635 | A1* | 9/2006 | Alexander | G06F 13/28 710/22 |
| 2006/0251092 | A1* | 11/2006 | Matterne | G06F 9/3877 370/412 |
| 2007/0226286 | A1* | 9/2007 | Kang | G06F 17/142 708/404 |
| 2011/0320672 | A1* | 12/2011 | Ganapathy | G06F 13/28 710/308 |
| 2014/0068170 | A1* | 3/2014 | Anderson | G06F 13/28 711/105 |
| 2014/0280421 | A1* | 9/2014 | Yang | G06F 17/142 708/404 |
| 2015/0195522 | A1* | 7/2015 | Li | H04N 19/12 375/240.03 |
| 2016/0275650 | A1* | 9/2016 | Case | G06T 3/606 |

FOREIGN PATENT DOCUMENTS

| | | |
|---|---|---|
| JP | S57-171276 A | 10/1982 |
| JP | H09-043343 A | 2/1997 |
| JP | 2000-314773 A | 11/2000 |
| JP | 2003-280982 A | 10/2003 |
| JP | 2005-156197 A | 6/2005 |
| JP | 2005-301665 A | 10/2005 |
| JP | 2012-160092 A | 8/2012 |
| JP | 2013-89023 A | 5/2013 |
| JP | 2015-7627 A | 1/2015 |
| KR | 2014-0051797 | 5/2014 |

OTHER PUBLICATIONS

Office Action dated Nov. 1, 2017 for Korean Patent Application No. 10-2016-0035939.
Office Action dated May 8, 2018 for Japanese Patent Application No. 2016-062424.
Ludloff, A. "Handbuch Radar und Radarsignalverarbeitung" Wiesbaden Vieweg, 1993, Seiten A-47 bis A-54.
Office Action dated Feb. 2, 2016 for German Patent Application No. 102015104776.4.
K. Nakashima, et al. "The Design of 10Gb Ethernet Interface Card for Accelerating Data Transfer with Matrix Transposition", Symposium on Advanced Computing Systems and Infrastructures SACSIS2006, Information Processing Society of Japan, vol. 2006, No. 5, p. 127-134.
Office Action dated Feb. 8, 2017 for Japanese Patent Application No. 2016062424.

* cited by examiner

| | | | | | | | | | | |
|---|---|---|---|---|---|---|---|---|---|---|
| A00 | A01 | A02 | A03 | A04 | A05 | A06 | A07 | A08 | A09 | ... |
| B00 | B01 | B02 | B03 | B04 | B05 | B06 | B07 | B08 | B09 | ... |
| C00 | C01 | C02 | C03 | C04 | C05 | C06 | C07 | C08 | C09 | ... |
| D00 | D01 | D02 | D03 | D04 | D05 | D06 | D07 | D08 | D09 | ... |
| A10 | A11 | A12 | A13 | A14 | A15 | A16 | A17 | A18 | A19 | ... |
| B10 | B11 | B12 | B13 | B14 | B15 | B16 | B17 | B18 | B19 | ... |
| C10 | C11 | C12 | C13 | C14 | C15 | C16 | C17 | C18 | C19 | ... |
| D10 | D11 | D12 | D13 | D14 | D15 | D16 | D17 | D18 | D19 | ... |
| A20 | A21 | A22 | A23 | A24 | A25 | A26 | A27 | A28 | A29 | ... |
| B20 | B21 | B22 | B23 | B24 | B25 | B26 | B27 | B28 | B29 | ... |
| C20 | C21 | C22 | C23 | C24 | C25 | C26 | C27 | C28 | C29 | ... |
| D20 | D21 | D22 | D23 | D24 | D25 | D26 | D27 | D28 | D29 | ... |
| A30 | A31 | A32 | A33 | A34 | A35 | A36 | A37 | A38 | A39 | ... |
| B30 | B31 | B32 | B33 | B34 | B35 | B36 | B37 | B38 | B39 | ... |
| C30 | C31 | C32 | C33 | C34 | C35 | C36 | C37 | C38 | C39 | ... |
| D30 | D31 | D32 | D33 | D34 | D35 | D36 | D37 | D38 | D39 | ... |
| A40 | A41 | A42 | A43 | A44 | A45 | A46 | A47 | A48 | A49 | ... |
| B40 | B41 | B42 | B43 | B44 | B45 | B46 | B47 | B48 | B49 | ... |
| C40 | C41 | C42 | C43 | C44 | C45 | C46 | C47 | C48 | C49 | ... |
| D40 | D41 | D42 | D43 | D44 | D45 | D46 | D47 | D48 | D49 | ... |

Ramp 0, Ramp 1, Ramp 2, Ramp 3, Ramp 4

Fig.4

METHOD AND DEVICE FOR PROCESSING RADAR SIGNALS

BACKGROUND OF THE INVENTION

Embodiments of the present invention relate to radar applications, in particular an efficient way to process radar signals obtained by at least one radar sensor, e.g., via at least one antenna. Processing radar signals in this regard in particular refers to radar signals received by a sensor or an antenna.

Several radar variants are used in cars for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e. a signal distributed across the frequency. The amplitude of the signal may indicate an amount of echo, wherein a peak may represent a target that needs to be detected and used for further processing, e.g., adjust the speed of the car based on another car travelling in front.

SUMMARY

A first embodiment relates to a device for processing radar signals comprising
 a DMA engine,
 a buffer,
 a processing stage,
 wherein the DMA engine is arranged
  for conducting a read access to a memory, wherein such read access comprises at least two data entries, and
  for filling the buffer by resorting the at least two data entries,
 wherein the processing stage is arranged for processing the data stored in the buffer.

A second embodiment relates to a method for processing radar signals, the method comprising the steps:
 (a) conducting a read access to a memory, wherein such read access comprises at least two data entries,
 (b) filling a buffer by resorting the at least two data entries,
 (c) processing the content of the buffer by a processing stage.

A third embodiment relates to a device for processing radar signals comprising:
 means for conducting a read access to a memory, wherein such read access comprises at least two data entries,
 means for filling a buffer by resorting the at least two data entries,
 means for processing the content of the buffer by a processing stage.

A fourth embodiment is directed to a computer program product directly loadable into a memory of a digital processing device, comprising software code portions for performing the steps of the method described herein.

A fifth embodiment is directed to a radar system comprising at least one device as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

FIG. 4 shows an exemplary allocation of the memory with data entries per antenna and ramp;

DETAILED DESCRIPTION OF THE PREFERRED EMBODIMENTS

In a radar processing environment, a radar source emits a signal and a sensor detects a returned signal. The returned signal may be acquired in a time domain by at least one antenna, in particular by several antennas. The returned signal may then be converted into the frequency domain by conducting a Fast Fourier Transform (FFT), which may result in a signal spectrum, i.e. a signal distributed across the frequency. Frequency peaks may be used to determine potential targets, e.g., along a moving direction of a vehicle.

A Discrete Fourier Transform (DFT) may be implemented in computers by numerical algorithms or dedicated hardware. Such implementation may employ FFT algorithms. Hence, the terms "FFT" and "DFT" may be used interchangeably.

The examples provided herein in particular allow for an efficient determining of an azimuth angle of the returned signals that is evaluated across the several antennas.

Figure 1:
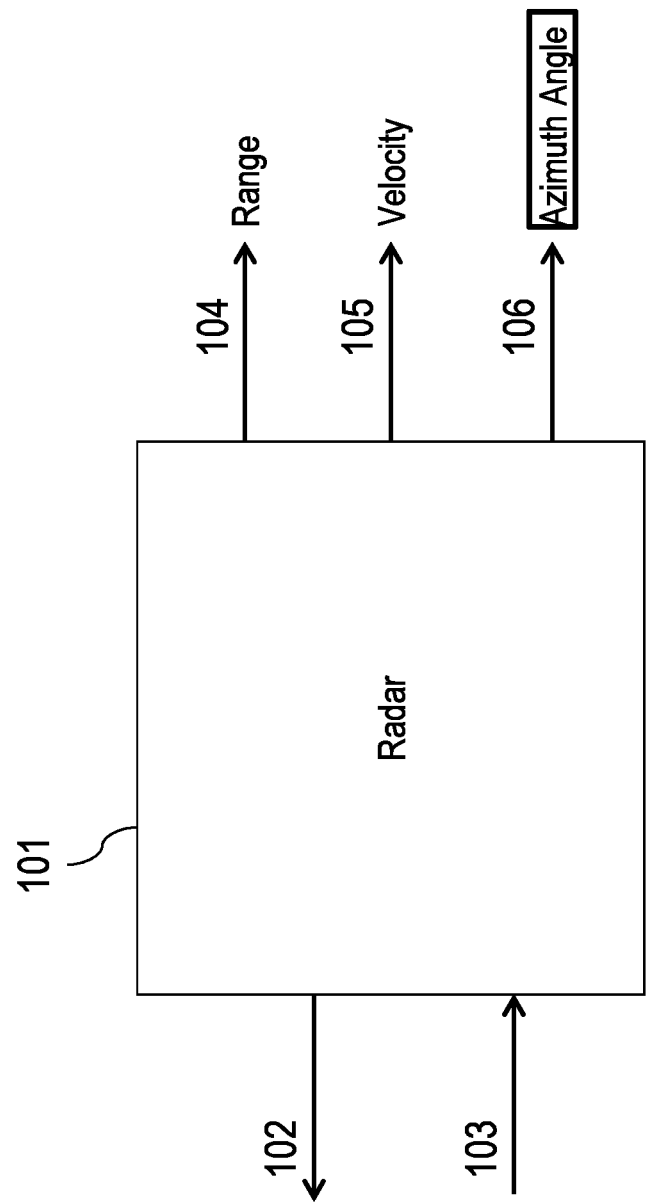
FIG. 1 shows a schematic diagram comprising an exemplary radar system emitting radar signals and receiving returned radar signals.

FIG. 1 shows a schematic diagram comprising an exemplary radar system 101 emitting radar signals 102 and receiving returned radar signals 103. The radar system 101 determines a range 104, a velocity 105 and an azimuth angle 106 based on the returned radar signals 103.

By using several receiving antennas, a phase difference of the received returned radar signals 103 may be used to determine the azimuth angle 106 via a third stage FFT. A first stage FFT based on the received returned (e.g., reflected emitted) radar signals 103 is used to determine the range 104, a second stage FFT based on the range 104 is used to determine the velocity 105 and the third stage FFT based on the velocity 105 is used to determine said azimuth angle 106.

In an exemplary scenario, the emitted radar signals 102 may be originated by two transmitter antennas towards an exemplary object. The signals 102 are reflected at the object and arrive at several (e.g., four) receiving antennas dependent on the azimuth angle with different phase position. Hence, the distances between the single object, the transmitter antennas and the receiver antennas may be deemed different.

Figure 2:
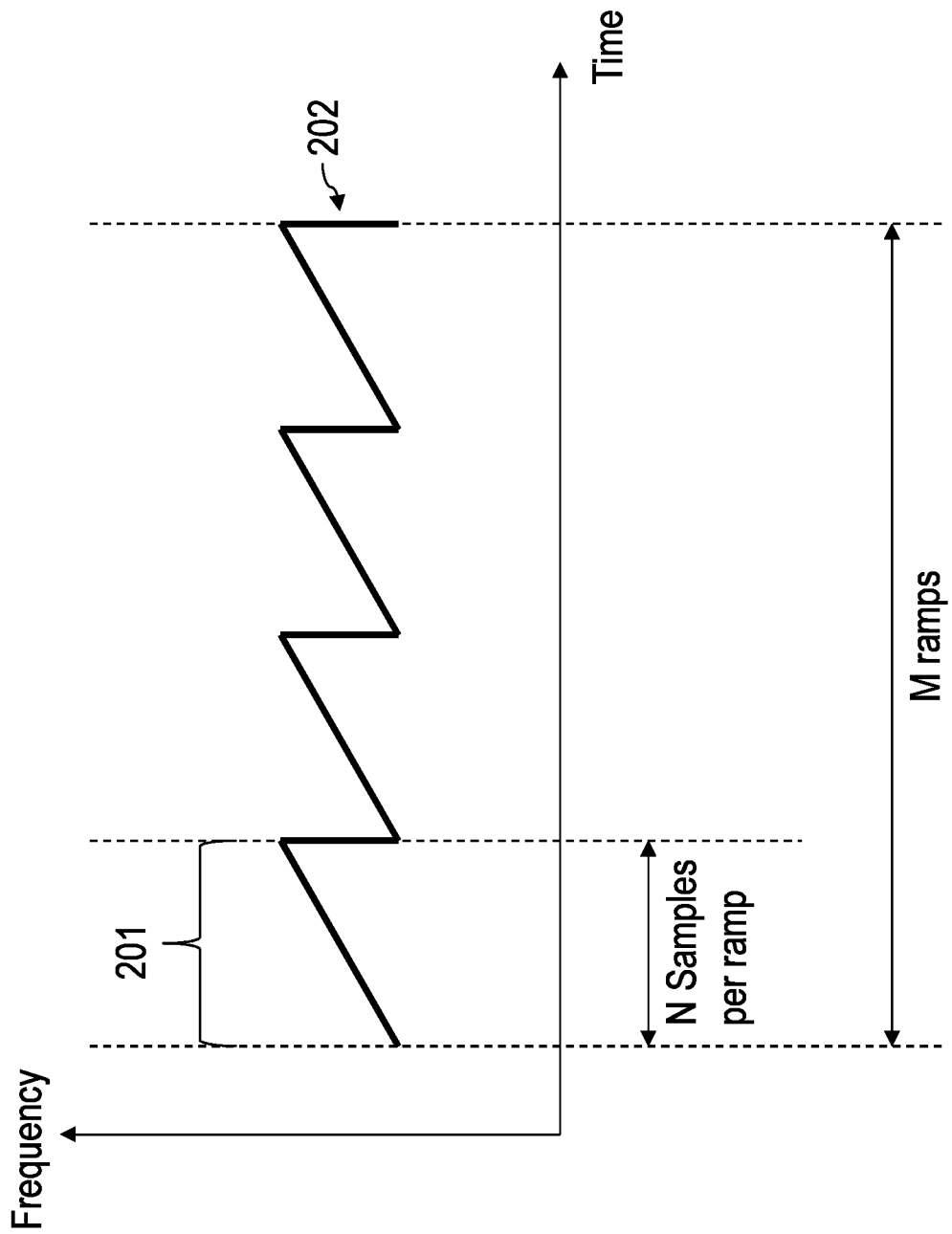
FIG. 2 shows a schematic of a ramp signal comprising of several ramps.

FIG. 2 shows a schematic of a ramp signal comprising of several ramps 201, wherein each ramp 201 may have a predetermined duration during which the frequency of the emitted radar signal was changed, e.g., increased. In other words, each ramp 201 may comprise signals of increasing frequency and a succession of ramps may determine the radar signal that is emitted via the transmitting antennas.

The emitted radar signal is reflected at the (distant) object and the reflection of the radar signal is received at the receiving antennas and sampled.

Hence, at each antenna, N samples are determined corresponding to each ramp 201, wherein a number of M ramps lead to a total of N*M samples per antenna. The samples may also be referred to as raw data and are subject to being processed in a processing stage, e.g., a FFT stage.

Radar data referred to herein may comprise raw data received at the at least one receiving antenna, interim processing results and/or final processing results, e.g., after FFT processing. Such radar data may be structured in the following dimensions: per ramp, per antenna, per acquisition.

Figure 3:
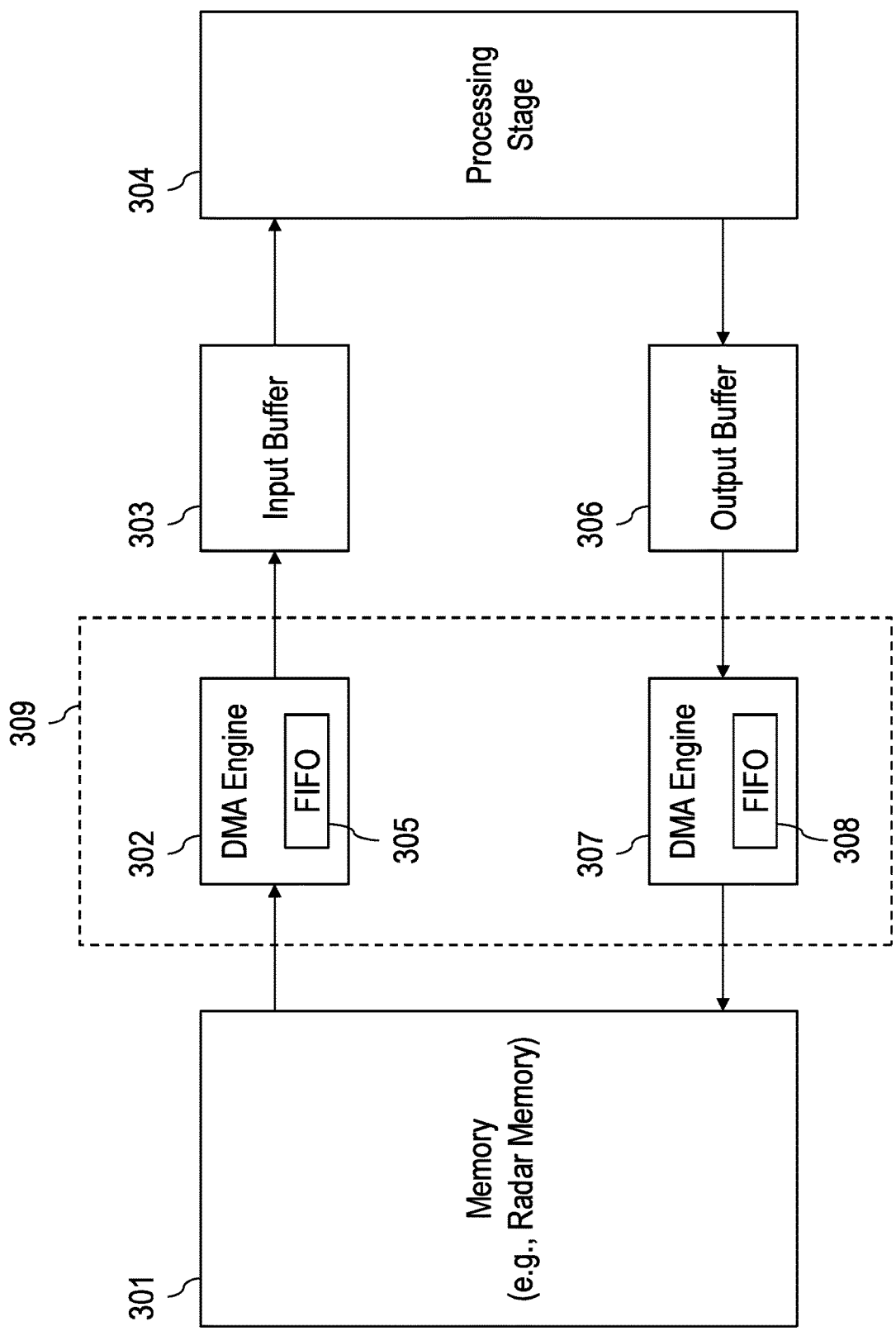
FIG. 3 shows a schematic diagram of a radar signal processing device.

FIG. 3 shows a schematic diagram of a radar signal processing device comprising a memory 301 (which may be a radar memory comprising the sampled radar data), a DMA engine 302 (DMA: direct memory access), an input buffer 303 and a processing stage 304.

Data is read via the DMA engine 302 from the memory 301 and stored in the input buffer 303. The processing stage 304 uses the data as stored in the input buffer 303 to perform operations efficiently. The processing stage 304 may be arranged to conduct linear processing on a number of data as stored in the input buffer 303. For example, the processing stage 304 may be an FFT processing stage that provides FFT results for a number of 256 samples, which are supplied in linear order of being processed by the input buffer 303.

It is noted that the processing stage 304 may be any of the following: a first FFT processing stage, a second FFT processing stage, a third FFT processing stage, a fourth FFT processing stage, a windowing stage, a beamforming stage, a processing stage providing coherent integration, a processing stage providing non-coherent integration, a processing stage conducting local maximum searches or a processing stage providing statistics.

It is further noted that more than one input buffer 303 may be provided. The processing stage 304 may operate on data fed to at least two input buffers in an alternating manner.

As an option, the input buffer 303 may be part of the DMA engine 302 or of the processing stage 304. The input buffer 303 may also be provided as a separate memory.

The DMA engine 302 may in particular comprise at least one FIFO memory 305 (FIFO: first-in-first-out). The DMA engine 302 may thus provide a high flexibility as how data read from the memory 301 are fed to the input buffer 303 and are therefore efficiently processed by the processing stage 304. For example, a transposition of data can be done either when filling the FIFO memory 305 of the DMA engine 302 or when filling the input buffer 303.

The results calculated at the processing stage 304 may be stored in any memory. In one exemplary embodiment, also shown in FIG. 3, such results may be stored in the memory 301. It may be in particular an option to store the results at the location in the memory 301 from where the data to be processed into those results was read. Hence, at least one output buffer 306 is provided which is filled by the processing stage. A DMA engine 307—which may comprise a FIFO memory 308 utilizing the FIFO concept described with regard to the DMA engine 302—uses writing back the data from the output buffer 306 to the memory 301.

It is noted that the DMA engine 302 may be regarded as input DMA engine and the DMA engine 307 may be regarded as output DMA engine. Both DMA engines 302, 307 may be combined in a block 309 providing a combined DMA (input and output) functionality.

It is further noted that the output of the processing stage 304 may be written to exact the same location (addresses) of the memory 301 from where the respective input was read. This may be efficient for radar applications, where, e.g., raw data are only required to compute first stage FFT data (then the raw data may never be used again): so the first stage FFT results are written over the raw data. This may apply for higher stage FFT computations accordingly. It is also an option, to not overwrite data in the memory 301, in particular to write results computed by the processing stage 304 to different addresses of the memory 301.

FIG. 4 shows an exemplary allocation of the memory 301 (or at least a portion thereof). Each entry (in this example a 64 bit value) in the memory represents a first stage FFT result. The entry-references used in FIG. 4 can be translated as follows:

The first letter (A to D) indicates the receiving antenna; in this example, four receiving antennas are used;

The first numeral indicates the number of the ramp (0 to 4); in this example, a total of M=5 ramps are used;

The second number indicates the number of the sample (within each ramp for each antenna); each ramp may be sampled by, e.g., 8, 16, 32, 64, 128 or 256 samples.

A second stage FFT is performed on the first stage FFT data as stored in the memory 301. However, in order to perform such second stage FFT in an efficient manner, the data that are subject to the second stage FFT need to be provided in a linear manner to the processing stage 304. For this purpose, the memory 301 is accessed by the DMA engine 302 and the input buffer 303 is supplied with the linear data that is required for efficiently conducting the second stage FFT (by the processing stage 304).

Read access to the memory 301 is conducted at a certain width (e.g., 256 bits), which in the example shown in FIG. 4 leads to reading four entries (each amounting to 64 bits) in the memory. These four entries are read to the FIFO memory 305 and are stored in the input buffer 303 in transposed form. As an option, such transposition can also be done when filling the FIFO memory 305 from the memory 301.

Figure 5:
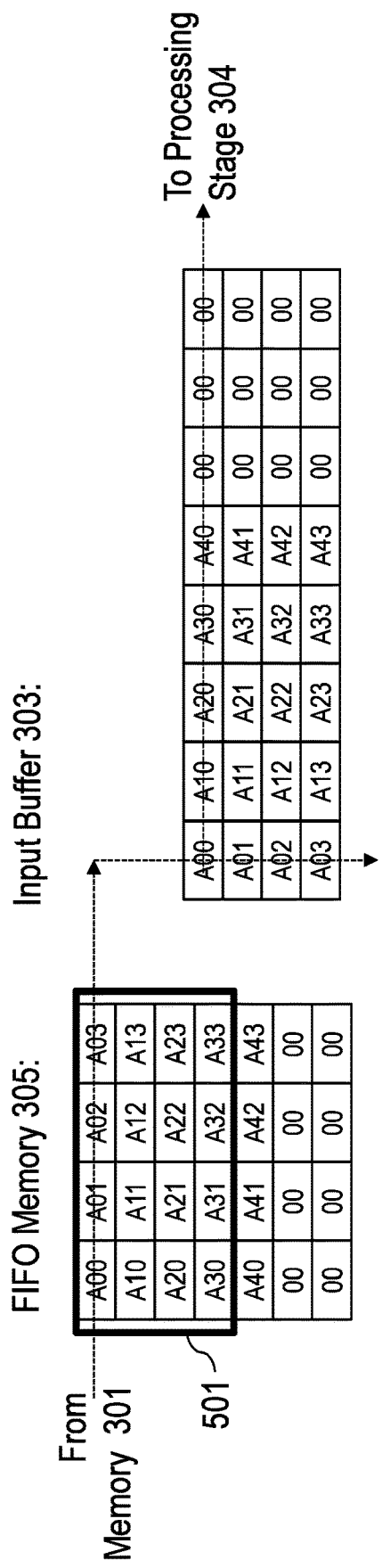
FIG. 5 shows the 256 bit read access to data of an antenna A (across the ramps) and it shows how the input buffer is filled with transposed data.

FIG. 5 visualizes the 256 bit read access to data of the antenna A (across the ramps) and it shows how the input buffer 303 is filled thereby providing transposed data. The FIFO memory 305 may in this example have four FIFO cells, each having the size of 256 bits. So the content of four read accesses to the memory 301 can be stored in the FIFO memory 305 (indicated by a frame 501). The individual FIFO cells of the FIFO memory 305 are processed as shown in FIG. 5: The first FIFO cell comprises the entries A00, A01, A02 and A03. These entries are written in transposed form to the input buffer 303 (hence, the line in the FIFO cell becomes a column in the input buffer 303). After that the next line in the FIFO memory 305 is processed; in addition, an additional line can be read to the FIFO memory 305 from the memory 301 (i.e. the frame 501 is moving one line down). This approach is continued until the input buffer 303 is filled. The processing stage 304 is arranged such that it efficiently processes the input buffer 303 line-wise. Hence, the FIFO memory 305 is used to fill the input buffer 303 such that efficient processing at the processing stage 304 is supported.

It is noted that zero-padding can be used up to fill up empty entries. In the example of FIG. 4 and FIG. 5, eight values are processed by the processing stage 304, whereas only 5 ramps are available. In this case, zero-padding can be used for the remaining three entries.

It is noted that the read access to the memory 301 can be directed to subsequent entries or to entries that have a predefined offset.

In the example of FIG. 4, the input buffer 303 is filled up with entries from the memory 301 such that a second stage FFT can efficiently be performed at the processing stage 304. This may be part of a velocity computation of the radar data. With the 256-bit wide read operation four entries of the memory 301 are read
for each antenna A to D,
for each ramp 0 to 4.

Then the base address is changed (incremented by 4) such that a subsequent 256-bit wide read operation is directed to the next four entries and the same mechanism as described above applies (i.e. for each antenna, for each ramp).

It is also an option to not process every ramp, but instead only every n-th ramp.

Another option may be to process every antenna, e.g., for angular computation purposes: The 256-bit wide read operation is directed to four entries of the memory 301
for each ramp 0 to 4,
for each antenna A to D.

Next, the base address may be adjusted to read the next set of entries from the memory 301 as described above.

The solution presented in particular allows efficiently using wide memory access, wherein more than one operand (entry) is read with each memory access. This in particular applies in case the operands read shall be written back to the same locations of the memory. This may be beneficial in case read-, modify- and write-operations to memory locations that are ECC-protected locations (ECC: Error Correcting Code) need to be avoided.

The processing stage 304 requires scattered access to the radar data stored in the memory 301. There may be many motivation for such scattered access; one example is a second stage FFT which needs input operands from the memory, which are not yet lined up in a linear manner for allowing the second stage FFT as a processing stage to operate efficiently. The processing stage may be most time-efficient if a particular number of input operands, e.g., 256, are subsequently provided via the buffer, whereas single read operations directed to addresses scattered across the memory and processing the single read results by the processing stage would be rather inefficient.

The memory access described herein may beneficially be optimized such that all operands that are obtained via a read operation are used and no such operand needs to be discarded. Another advantage is that full width memory write transfer is used, which is in particular beneficial when using ECC.

Examples presented herein allow reading several operands from the memory and writing the results of the processing stage to this portion of the memory (or, as an alternative, to another portion of this or to a separate memory). Hence, the approach presented allows full flexibility in utilizing at least one memory in combination with the processing stage.

For example, an address Dest may be calculated based on the following formula $$Dest=Base+C_S \cdot O_S+C_R \cdot O_R+C_A \cdot O_A,$$

wherein

Base is a base address;
C is a counter;
O is an offset;
S refers to a sample (or bin) loop;
R refers to an inner loop, which can be used as antenna loop or any other loop; and
A refers to an outer loop, which can be used as ramp loop or any other loop.

Hence, the address Dest is determined on a base address Base in combination with three loops, a sample loop, a ramp loop and an antenna loop. Each loop comprises a counter and an offset.

The DMA engine may comprise FIFO memory to support full width data read operations from the memory and/or full width data write operations to the memory.

A transpose operation on the data read may be performed either when reading radar data from the memory and filling the FIFO memory or when filling the buffer. The inverse transpose operation may be performed either before writing radar data to the memory by filling the FIFO memory or by filling the buffer.

An output DMA engine may duplicate the addressing sequence that was used for the input DMA engine to write back results at the same location from where they were read before. This utilizes the space of the memory in an efficient manner. The DMA engine may comprise at least one FIFO memory, in particular at least one FIFO cell.

Examples described herein in particular suggest a DMA engine that utilizes at least one FIFO memory (comprising several FIFO cells). The at least one FIFO memory may be connected to the DMA engine. The at least one FIFO memory may be part of the DMA engine.

The solution presented allows for a higher performance of the radar system and for a reduced power consumption due to the reduced number of memory access.

The examples suggested herein may in particular be based on at least one of the following solutions. In particular combinations of the following features could be utilized in order to reach a desired result. The features of the method could be combined with any feature(s) of the device, apparatus or system or vice versa.

A device for processing radar signals is provides, the device comprising
a DMA engine,
a buffer,
a processing stage,
wherein the DMA engine is arranged
for conducting a read access to a memory, wherein such read access comprises at least two data entries, and
for filling the buffer by resorting the at least two data entries,
wherein the processing stage is arranged for processing the data stored in the buffer.

The radar signal may be any signal (e.g., sample, raw or processed data) that is based on a signal received by at least one receiving antenna.

The DMA engine allows direct memory access to a memory, which may be part of the device or external to the device. The buffer is a memory that allows lining up data such that they can be processed by the processing stage in an efficient manner. The buffer may be part of the processing stage or it may be provided external to the processing stage.

Hence, based on the width of the read access several data entries may be read at once. These data entries may in this order, however, not be subject to a linear processing by the processing stage. Instead, the data entries may be subject to different streams that are to be processed by the processing stage. Hence, the DMA engine allows resorting these data entries such that they become, e.g., part of different streams. Each stream may be a succession of entries that can be efficiently processed by the processing stage. Hence, such resorting may be achieved by storing the at least two data entries in a transposed form in the buffer.

It may be an option that the resorting feature provided by the DMA engine can be enabled or disabled.

In an embodiment, the DMA engine is arranged for filling the buffer by storing the at least two data entries in transposed form.

The term "in transposed form" may in particular refer to storing data entries that were adjacent to each other such that they become part of different processing streams, wherein each processing stream is separately fed to the processing stage.

In an embodiment, the DMA engine comprises at least one FIFO memory, wherein the DMA engine is arranged for filling the buffer by resorting the at least two data entries via the at least one FIFO memory.

It is noted that the transposition of the at least two data entries can be conducted when filling the FIFO memory from the memory or when filling the buffer from the FIFO memory.

It may be an option to deal with different numbers of data entries by selecting the number of active FIFO memories (or FIFO cells in case one FIFO memory has several selectable FIFO cells).

In an embodiment, the processing stage comprises at least one of the following:
 a FFT processing stage,
 a windowing stage,
 a beamforming stage,
 a processing stage providing coherent integration,
 a processing stage providing non-coherent integration,
 a processing stage conducting local maximum searches,
 a processing stage providing statistics.

In an embodiment,
 the DMA engine comprises an input DMA engine and an output DMA engine,
 the buffer comprises an input buffer and an output buffer,
 the input DMA engine is arranged
  for conducting a read access to the memory, wherein such read access comprises at least two data entries, and
  for filling the input buffer by resorting the at least two data entries,
 the processing stage is arranged for processing the data stored in the input buffer and for writing results of the processing stage to the output buffer,
 the output DMA engine is arranged
  for conducting a write access to the memory, wherein such write access comprises storing at least two data entries from the output buffer to the memory.

It is in particular an option that the results determined by the processing stage are stored at the very same location of the data entries that served as input.

In an embodiment, the device further comprises the memory.

Also, a method is suggested for processing radar signals, the method comprising the steps:
 (a) conducting a read access to a memory, wherein such read access comprises at least two data entries,
 (b) filling a buffer by resorting the at least two data entries,
 (c) processing the content of the buffer by a processing stage.

The data entries of the read access may be based on the width of the read access. Such read access may be directed to 256 bits which comprise four adjacent 64 bits data entries.

In an embodiment, the step (a) and the step (b) are part of a loop, which is processed until an exit condition is met.

In an embodiment, the exit condition is based on at least one of the following:
 a number of ramps;
 a number of antennas;
 a number of samples.

In an embodiment, the step (a) and the step (b) are conducted by a DMA engine.

In an embodiment, filling the buffer by resorting comprises: filling the buffer by storing the at least two data entries in transposed form.

In an embodiment, the method further comprises:
 (d) writing results of the processing stage to an output buffer,
 (e) conducting a write access to the memory, wherein such write access comprises storing at least two data entries from the output buffer to the memory.

In an embodiment, the step (e) is conducted by the DMA engine.

Also, a device for processing radar signals is suggested, the device comprising:
 means for conducting a read access to a memory, wherein such read access comprises at least two data entries,
 means for filling a buffer by resorting the at least two data entries,
 means for processing the content of the buffer by a processing stage.

A computer program product is provided, which is directly loadable into a memory of a digital processing device, comprising software code portions for performing the steps of the method as described herein.

A radar system is suggested comprising at least one device as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device for processing radar signals, comprising:
    a Direct Memory Access (DMA) engine comprising an input DMA engine, an output DMA engine, and at least one FIFO memory;
    a buffer comprising an input buffer and an output buffer; and
    a processing stage,
    wherein the input DMA engine is arranged:
        to conduct a read access to a main memory, wherein such read access comprises at least two data entries that comprise radar data, and
        to fill the input buffer by transposing the at least two data entries via the at least one FIFO memory,
    wherein the processing stage is arranged to process the at least two data entries stored in the input buffer and to write results of the processing stage to the output buffer, and
    wherein the output DMA engine is arranged to conduct a write access to the main memory, wherein such write access comprises storing the at least two data entries from the output buffer to the main memory.

2. The device according to claim 1, wherein the processing stage comprises at least one of the following:
    a FFT processing stage,
    a windowing stage,
    a beamforming stage,
    a processing stage providing coherent integration,
    a processing stage providing non-coherent integration,
    a processing stage conducting local maximum searches, and
    a processing stage providing statistics.

3. The device according to claim 1 further comprising the memory.

4. A radar system comprising at least one device according to claim 1.

5. A method for processing radar signals, the method comprising:
    (a) conducting a read access to a main memory by an input Direct Memory Access (DMA) engine having at least one FIFO memory, wherein such read access comprises at least two data entries that comprise radar data;
    (b) filling an input buffer, by the input DMA engine, by transposing the at least two data entries via the at least one FIFO memory;
    (c) processing, by a processing stage, that at least two data entries stored in the input buffer;
    (d) writing results of the processing stage to an output buffer; and
    (e) conducting a write access to the main memory by an output DMA engine having a FIFO memory, wherein such write access comprises storing the at least two data entries from the output buffer to the main memory.

6. The method according to claim 5, wherein the step (a) and the step (b) are part of a loop, which is processed until an exit condition is met.

7. The method according to claim 6, wherein the exit condition is based on at least one of the following:
    a number of ramps;
    a number of antennas; and
    a number of samples.

8. A computer program product directly loadable into a memory of a digital processing device, comprising software code portions for performing the steps of the method according to claim 5.

9. A device for processing radar signals, comprising:
    an input Direct Memory Access (DMA) having at least one First-In-First-Out (FIFO), memory and configured to conduct a read access to a main memory, wherein such read access comprises at least two data entries that comprise radar data;

an input buffer configured to be filled by the input DMA transposing, via the FIFO memory, the at least two data entries via a FIFO memory;

a processing stage configured to process the at least two data entries of the input buffer;

writing results of the processing stage to an output buffer; and an output DMA engine having a FIFO memory and configured to conduct a write access to the main memory, wherein such write access comprises storing the at least two data entries from the output buffer to the main memory.

* * * * *